Sept. 3, 1935.  E. E. OPEL  2,013,420
PRESET STARTING DEVICE
Filed June 24, 1932  3 Sheets-Sheet 2
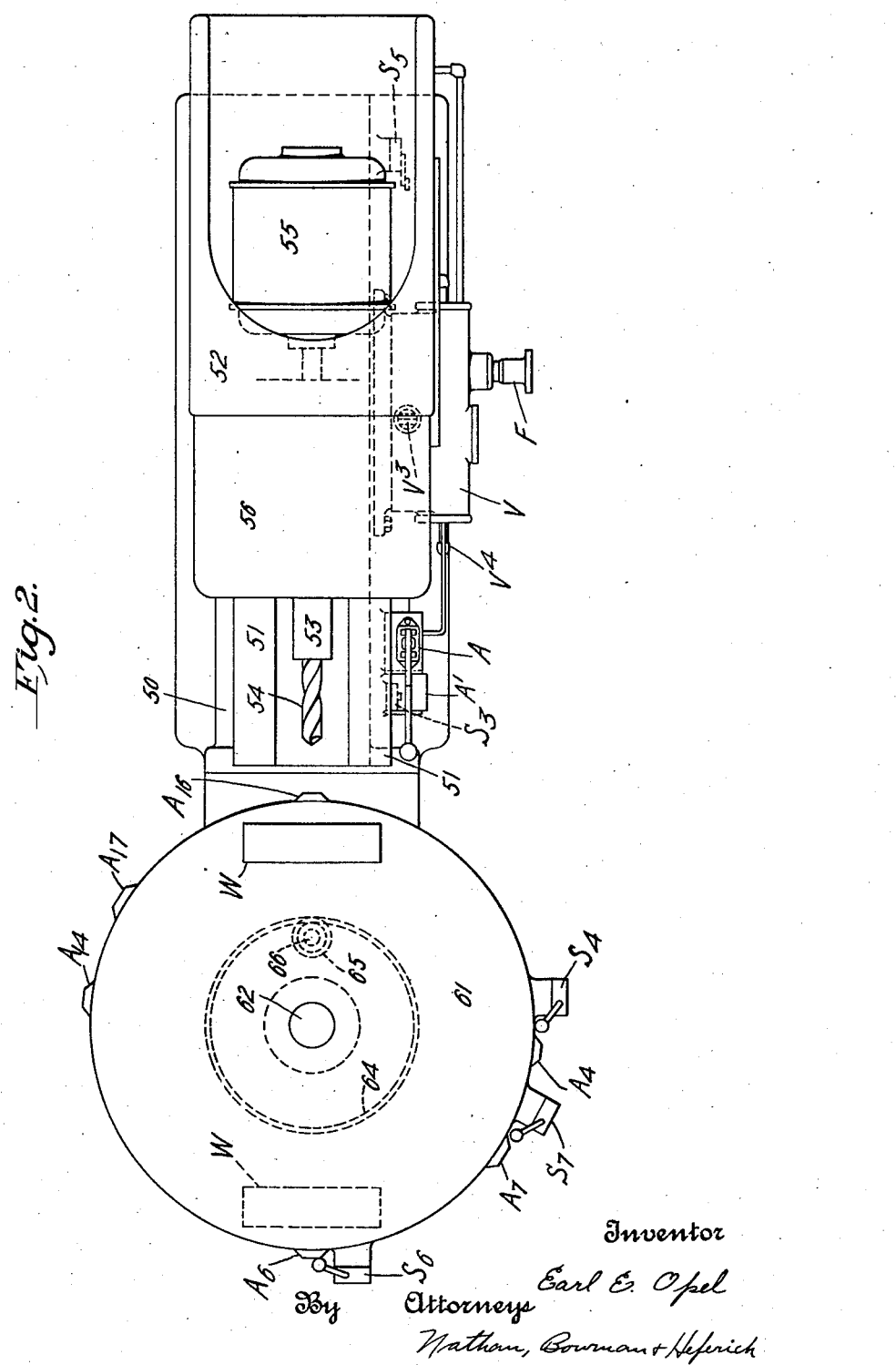
Inventor
Earl E. Opel
By Attorneys
Nathan, Bowman & Heferich Sept. 3, 1935.    E. E. OPEL    2,013,420
PRESET STARTING DEVICE
Filed June 24, 1932    3 Sheets-Sheet 3
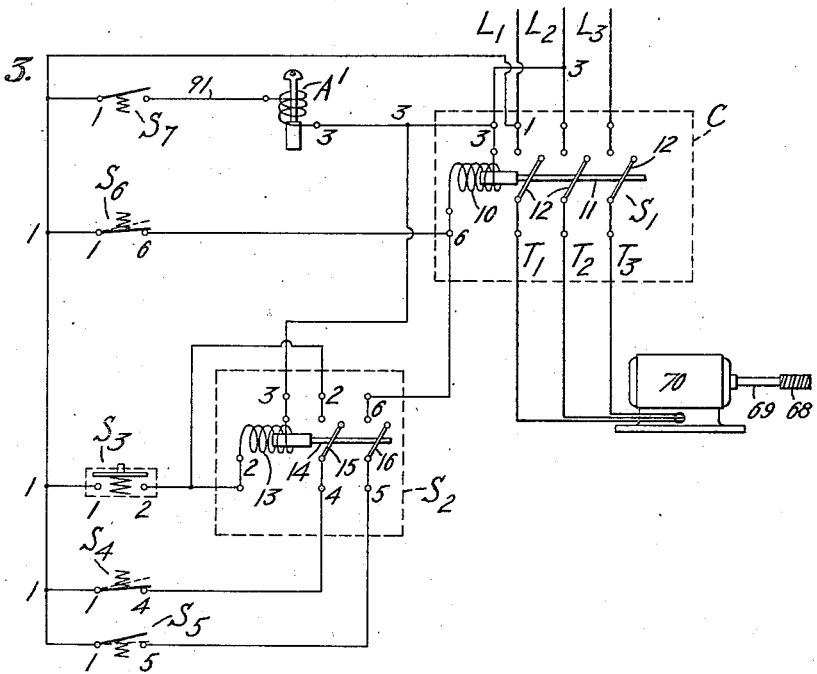
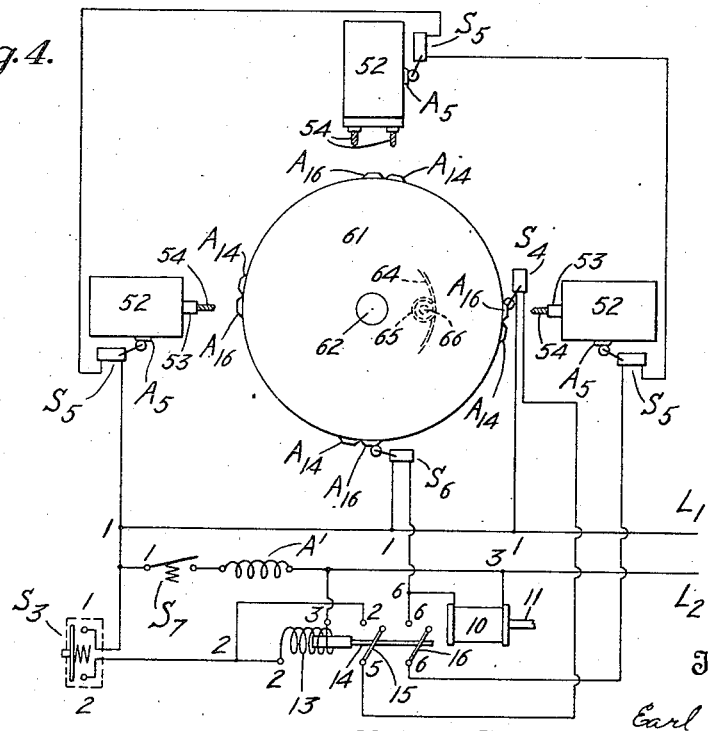

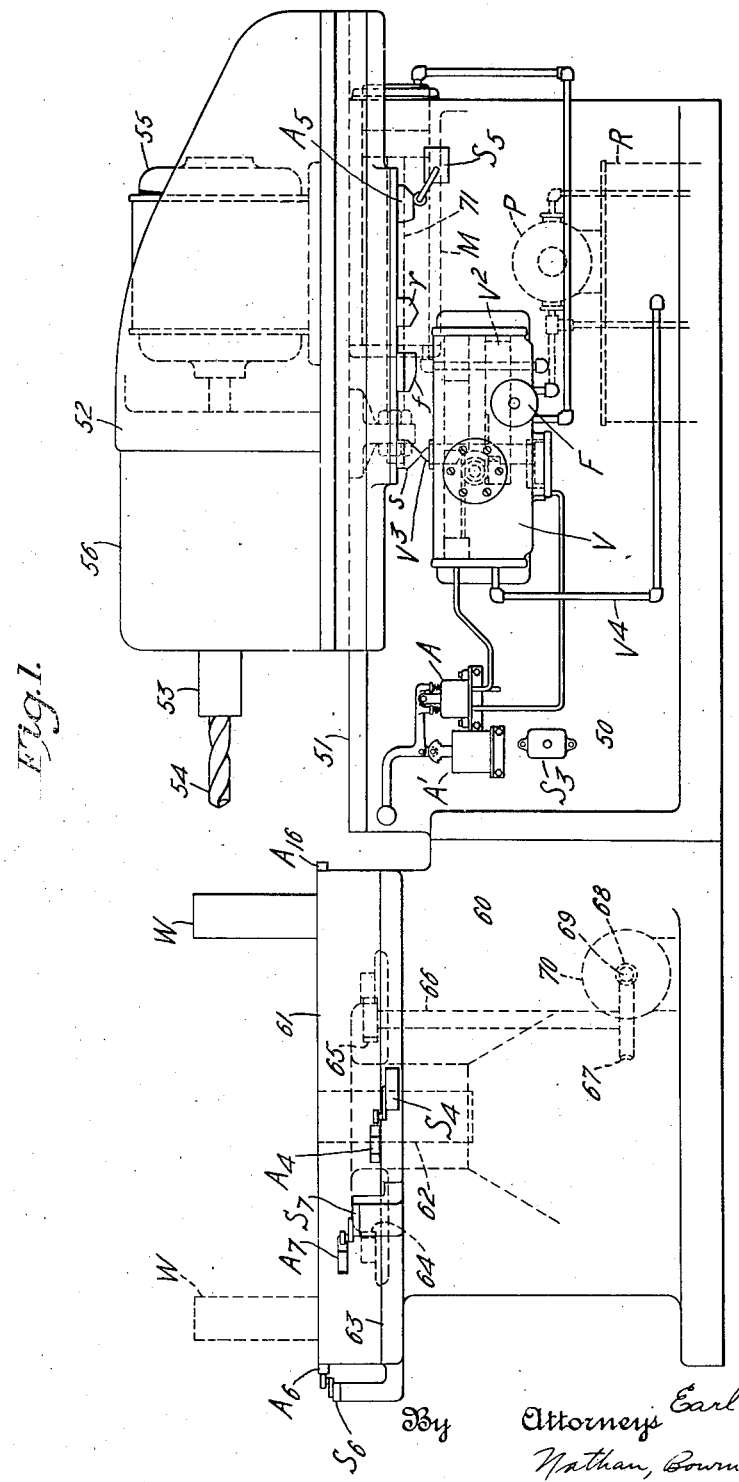

Patented Sept. 3, 1935

2,013,420

UNITED STATES PATENT OFFICE 2,013,420

PRESET STARTING DEVICE

Earl Edgar Opel, Richmond, Ind., assignor to The National Automatic Tool Company, Richmond, Ind., a corporation of Indiana Application June 24, 1932, Serial No. 619,133

17 Claims. (Cl. 77—32)

This invention relates in general to automatically controlled machine tools and particularly to such machines in which it is desired to re-set the cycle of automatically controlled operations without a loss of time between cycles. It has for a main object to provide means and a control therefor for initiating the indexing movement of the work or tool carrier at the completion of the tooling operation without endangering the operator or machine in the event that sufficient time has not been allowed for the removal of a finished work-piece and/or the chucking of a new blank.

In many machine tool organizations power means have been provided for effecting relative indexing movements between the tool and work-piece thereby to present an unfinished blank or piece in operative relation to the tools, and which have heretofore been actuated or set in operation upon the completion of the tooling operation. Usually a predetermined length of time is allowed between the completion of the tooling operation and the initiation of the indexing movement to allow the operator of the machine time to remove the finished piece and insert an unfinished blank.

It has been found in practice that to allow a definite time for the work changing operation is dangerous, both to the operator and to the machine, as it not infrequently occurs that an operator fails, in the allotted time, to complete the reloading operation before the machine starts to move. As a consequence, there exists a hazardous unsafe condition and the new work-pieces are improperly mounted.

Furthermore, if the work changing time is increased, the element of danger is not thereby removed, and, in addition, at the end of even a few hours operation, considerable time may be wasted in waiting for the mechanism to index. Likewise, if the starting of indexing mechanism must be initiated by the operator each time and after the tool head has receded from the work, there is that much additional delay.

The present invention is designed to overcome the disadvantages of prior machines and has for a primary object to provide means for safeguarding the operator and/or the machine from such injuries as may be occasioned by untimely or premature indexing of the carrier.

An object of this invention, therefore is to provide means for enabling the operator to initiate the indexing cycle immediately upon completing the mounting of a new piece so that when the tooling operation is completed the indexing automatically is effected and thus there is no idle or elapsed time between cycles.

Another object of this invention is to arrange the parts so that even though the operator initiates the indexing cycle the indexing of the carrier will not take place until after the tool head, or each of the tool heads, if more than one is employed, has completed its tooling operation upon the work-piece at its respective station.

A particular object of this invention is to provide manually and automatically controlled electrically actuated means for controlling the movement of the indexible member, interlocked with the translatable member, such as, for example, the tool carrier or tool carriers in a manner such that the electrically controlled means is ineffective to start the indexing mechanism until the tool carrier reaches a predetermined position in its cycle and is also ineffective to start the indexing movement until the operator has completed the chucking of the new piece even though the tool heads may have already reached their rearmost positions.

Still another object of this invention is to provide automatically controlled electrically actuated means for starting the tool carrier forward at the completion of the indexing movement and thereby reduce to a minimum the idle time between the completion of the indexing and the starting of the translatory movements, and render the machine more fully automatic in its operation.

In carrying out the objects of this invention it is proposed to provide power transmission mechanism for indexing the carrier, arranged to be connectible with a source of power. The connecting means in the present disclosure includes an electro-magnetically operated switch for making and breaking the main electric circuits of a motor that forms part of the transmission mechanism. Obviously, other connecting means such as shifting gears, clutches, etc., may be employed if another type of transmission is more readily available.

The electro-magnetic switch for the main circuit forms part of an auxiliary electrical system which includes therein primary and secondary circuits, primary and secondary holding circuits, relays, and auxiliary switches, all of which are arranged in a cooperative manner to bring about the results hereinabove mentioned and which will be described in detail in connection with the drawings.

The various switches are so located with respect to the movable elements of the machine tool organization as to be actuated thereby in a predetermined sequence.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figures 1 and 2 depict a representative type of machine tool incorporating the present invention and which will serve to illustrate the features and principles involved. Fig. 3 is a schematic diagram of the electrical control circuit therefor; and Fig. 4 is a diagram of an adaptation of the pre-set starting circuit to a multiple tool head machine.

The machine illustrated in Figs. 1 and 2 comprises a base member 50, the upper surface of which is provided with guideways 51 for supporting and guiding a translatable tool head 52. The head 52 supports a spindle 53 the forward end of which carries a suitable tool 54. A motor 55, through a conventional speed change mechanism located in the gear box 56 is adapted to drive the spindle at the rate and in the direction selected.

Associated with the support 50 is a second support 60 upon which is mounted an indexible table or carrier 61. The table is adapted to be moved periodically about a central vertical axis 62 on the ways 63 and is adapted to carry on its upper surface suitable jigs or work holding fixtures for the support of the work-pieces indicated generally as W. The indexing transmission may be any of the well known or conventional designs adaptable for the purpose but, as here shown, comprises an internal gear 64 which is driven by a pinion 65 secured to a drive shaft 66. The lower end of the shaft 66 is provided with a worm wheel 67 that meshes with a worm 68 secured to the shaft 69 of the motor 70. Thus when the motor 70 is connected with the main power lines, the table will be propelled about the axis 62, and when the power is disconnected the table stops, the controls for the transmission being so arranged as to stop the indexing movements when the work-pieces arrive in the position to be acted upon by the tools 54. For the purposes of illustrating an application of the present invention, an indexing mechanism of the simpler type is chosen; but it will be understood that other types may be employed, such as those including a Geneva mechanism shown e. g. in the patent to Prentice #874,035 or Seward #1,063,744.

The tool carrier 52, in the instant case, is adapted to be translated on the ways 51 toward and away from the work by means of a hydraulic motor M supported by the base member 50. The piston rod 71 of the motor is secured to the underside of the carrier 52 and thus, as fluid under pressure is admitted to one end of the motor the piston thereof and rod 71 are moved at a rate proportionate to the rate of admission of fluid. A rate and direction fluid control valve V is provided and which is arranged to be controlled manually and automatically.

Inasmuch as the particular form of valve employed is not of the essence of this invention, the same will not be described in detail. Suffice it to say that it comprises a sliding valve plunger member $V^2$ which is given a step by step movement thereby to control the flow of pressure fluid supplied by the pump P, to the respective ends of the motor M. The step by step movement of the plunger $V^2$ is controlled by an interference bar $V^3$ which lies in the path of movement of a series of trip dogs $f$, $r$ and $s$ adjustably mounted upon the carrier 52.

Fig. 1 of the drawings illustrates the positions of the parts before the tool carrier starts its movement forward at a rapid traverse rate, and to start the carrier forward, the air valve A is actuated thereby to set or move the valve plunger to the rapid traverse forward position by means of air pressure. The carrier then moves forward at a rapid rate until dog $f$ engages the bar $V^3$ and depresses same to allow the valve plunger $V^2$ to advance to a predetermined position, namely, the feed position. Fluid is then admitted to the motor M at a slower rate and consequently the rate of forward movement of the carrier is reduced to a given feed rate. Variations in the rate of feed may be effected by adjusting the feed control valve F.

The carrier continues to advance at the feed rate desired until the tooling operation is completed, at which time the trip dog $r$ engages and moves the bar $V^3$ to allow the valve plunger $V^2$ to advance another step, or to the rapid traverse reverse position. Pressure fluid will then be directed to the opposite end of the motor M and the movement of the carrier is reversed. The carrier recedes at a rapid rate until the stop dog $s$ engages and moves the bar $V^3$ so that the valve plunger may take up a new position discontinuing all flow of pressure fluid to the motor and returning same to the reservoir R through the drain line $V^4$. The valve mechanism such as herein illustrated, may be of any suitable form. It has been found convenient, however, to employ the device disclosed in the U. S. Patent #1,780,471, to which reference may be had for further information or details.

It may be mentioned also that the air valve A upon movement of the hand lever in the direction opposite to that of starting effects a withdrawal of the interference bar $V^3$ and thus acts as an emergency release to reverse the movement of the carrier at any point in its cycle of movements. Obviously, various other forms of transmission mechanisms and controls therefor may be resorted to and consequently I do not limit myself to the specific form disclosed herein.

Heretofore, machine tool organizations have been designed so that the table, such as table 61, indexes the moment the tool carrier clears the work-piece on its return stroke, thereby endangering the operator and the machine or work-piece in the event that the mounting of the new piece has not first been completed. To overcome this hazardous manner of operation and further to increase with safety the productive capacity of the machine tool, it is proposed to provide electrically operated controls, manually and automatically operated, for the indexible member, serially arranged so that both must be operated before the carrier will index.

Fig. 3 illustrates diagrammatically a form of electrical circuit for accomplishing the above purposes and in which $L_1$, $L_2$ and $L_3$ represent the main power lines leading to the motor 70 that provides the power for indexing the carrier 61.

Starting and stopping of the movements imparted to the carrier 61 are regulated by means of an electrically controlled and operated controller mechanism, indicated generally by the reference character C, which in the present instance includes a three-pole self-opening magnetic switch $S_1$. When the solenoid 10 thereof is energized, the armature or core 11, to which a plurality of switch arms 12 may be connected, moves to the left, as shown in the diagram, thereby completing the electrical circuit between lines $L_1$, $L_2$ and $L_3$ and motor terminals $T_1$, $T_2$ and $T_3$, and the index motor starts to operate.

In certain cases it may be desirable that the movement of the work carrier be effected by hydraulic means or by mechanical means connected with or driven from the power transmission of the machine and in such cases the armature 11 may be readily connected with or arranged to shift a valve, clutch or gears, depending upon the type of transmission employed, to start and stop the indexing of the carrier.

The controller C, however, is adapted to be electrically actuated and controlled and before the solenoid 10 may be energized to actuate the controller, a control relay $S_2$ must first be rendered effective. For the purpose of clarifying the description of the various control circuits, the circuits may be classified as follows: A main circuit which is subdivided into a controller circuit and a maintaining circuit, and a pre-set starting circuit which includes a starting circuit for the relay and a holding circuit therefor.

Each of these groups of circuits may be connected independently to separate sources of electrical supply or they may be grouped together and receive current from a single source common to all, as illustrated in Fig. 3 of the drawings.

The pre-set starting circuit for the relay $S_2$ comprises a branch line 1 connected with the power line $L_1$ and in which there is a starting switch $S_3$, preferably of the push button type. The switch $S_3$ is connected by lines 2—2, with one terminal of a solenoid 13, the other terminal of which is connected by lines 3—3 with one of the main power lines, for example $L_2$. When switch $S_3$ is closed, current from line $L_1$ passes through lines 1—1, switch $S_3$, lines 2—2, coil 13, lines 3—3 to $L_2$, thereby energizing the coil which moves the core 14, to the left and closes switches 15 and 16.

The closing of switch 15 completes the circuit between $L_1$ and $L_2$, independently of the starting switch $S_3$, and the current then flows through lines 1—1, (switch $S_4$ which is normally maintained closed) 4—4, switch 15, lines 2—2, coil 13 and line 3 and thus hold the switches 15 and 16 closed. The holding circuit for the relay, just described, eliminates the necessity of the operator holding the push button switch $S_3$ closed and same may be released immediately. The purpose of switch $S_4$ will be made clear later, but for the present it is to be remembered that it is closed at all times except during a portion of the indexing movement of the carrier.

Simultaneously with the closing of switch 15, the second switch 16 of the controller circuit is closed and remains closed so long as the relay holding circuit is effective. Connected in series with the switch 16 is a second switch $S_5$ which is normally open but arranged to be closed only when the tool carrier is at its rearmost position. Assuming that the tool carrier is back, the current in the controller circuit will then flow through lines 1—1, switch $S_5$, lines 5—5, switch 16, lines 6—6, coil 10 and lines 3—3, thus energizing the coil 10 to close the main switch $S_1$ of the controller C which starts the motor 70 and the indexing movement.

Since the holding circuit for the switch $S_2$ will be broken, as above stated, during the indexing movement, a maintaining circuit for the controller is arranged to become effective when the indexing movement starts and comprises a switch $S_6$ adapted to connect lines 6—6 with 1—1 independently of the switch $S_5$ and the relay $S_2$ thereby to maintain the coil 10 energized and switch $S_1$ closed during the entire indexing movement even though the switch $S_5$ opens after the commencement of the indexing.

The auxiliary switch $S_6$ in the maintaining circuit for the controller actuator is adapted to be closed during the indexing movement but is arranged so as to be opened at the completion of the indexing thereby to break the circuit to the solenoid 10. The motor switch $S_1$ will then open and the work carrier comes to rest with the work-pieces carried thereby arranged in a position to be operated upon by the tools.

*Operating cycle*

The limit switches $S_4$, $S_5$, $S_6$ and $S_7$ which control the various circuits must, of course, be actuated in a definite prearranged sequence or cycle and with that end in view switch actuating dogs $A_4$, $A_5$, $A_6$ and $A_7$ are provided. The dogs $A_4$ and $A_6$ are carried by the work carrying member and actuate switches $S_4$ and $S_6$, while dog $A_5$ is carried by the tool carrier and actuates the limit switch $S_5$. The starting button $S_3$ may be located at any place convenient to the operator.

The cycle of the machine is as follows: The operator mounts a work-piece W, shown in dotted lines, at the loading station and then presses the pre-set starting button $S_3$. This act initiates the indexing movement by completing the auxiliary circuit (1—2—13—3) that controls the operation of the relay $S_2$. The switches 15 and 16 thereof immediately close, the switch 15 completing the holding circuit (1—4—15—2—13—3) for the relay $S_2$, and switch 16 completing a portion of the main circuit (5—16—6—10—3) which controls the actuation of index controller C. In the present example, the motor control switch $S_1$ is not thrown unless or until the limit switch $S_5$ is closed and this can occur only when the tool head is at its rear limit of travel. Referring to Fig. 1, the tool head is illustrated in its rear position whereby the trip dog $A_5$ is brought into engagement with and moves, or has moved, the arm of the switch $S_5$ to a closed position completing the controller actuating circuit (1—5—16—6 etc.). The motor switch $S_1$ will then close and the table starts indexing.

At the beginning of the indexing movement the trip dog $A_6$ moves away from the arm of switch $S_6$ allowing same to close, thereby to render the maintaining circuit (1, $S_6$, 6, 10, 3) effective to hold the motor switch $S_1$ closed until the work-piece on the carrier reaches a predetermined point in its travel. During the movement of the carrier the dog $A_{14}$ engages and opens the switch $S_4$ in the relay holding circuit (1, 4, 15, 2, 3) and the relay switches 15 and 16 snap open. The parts in the relay control circuits are thus re-set or returned to their normal positions and ready for operation when the push button $S_3$ is again pressed.

Meanwhile the maintaining circuit of the controller is effective and maintains the motor switch $S_1$ closed and the carrier 61 continues its indexing movements until the dog A₁₆ engages the arm of switch S₆ and opens same. At this point the maintaining circuit is broken and the motor switch S₁ moves to its open position thus disconnecting the power to the index motor and the carrier movement stops. It is to be understood that the various dogs and switches, above mentioned, are so located with respect to each other and with the work and tool carriers that the work carrier is brought to a stop with the unfinished work-piece or work-pieces in position to be operated upon by the tools. It will be further appreciated that preferably suitable locating and locking means will be associated with the indexing means to ensure that the index head will be disposed at the exact position for operation of the tools.

Just prior to the completion of the indexing movement of the table 61, one of the dogs A₇ or A₁₇ closes momentarily a limit switch S₇ in the circuit of the solenoid A¹ and then passes over the switch allowing it to resume its normal open position. The momentary closing of the switch S₇ completes the circuit (1, 91, 3) to the solenoid A¹ and renders the solenoid operative to oscillate the control lever of the air valve A thereby to effect a resetting of the main valve V to start the tool carrier 52. At the beginning of the forward movement of the tool carrier 52, the trip dog A₅ moves away from the arm of the limit switch S₅ and the latter moves to its open position.

As hereinbefore explained the tool carrier moves first at a rapid traverse rate, then at a feed rate when the work is about to be reached and during the tooling operation, and then, at the completion of the tooling, at a rapid traverse return to the stop position, dogs $s$, $f$ and $r$, in conjunction with the valve V, controlling these various movements in the manner hereinbefore explained.

It will be noted that should the operator attempt to effect indexing of the table at any time after the tool carrier starts forward and prior to the return of same to its rearmost position, the limit switch S₅ is open and prevents the controller actuating circuit 1, 5, 16, 6, 10, 3 to the motor switch S₁, from being completed and effective to initiate a new indexing cycle, even though the actuation of the push button S₃ effects a closing of the switches 14 and 15.

In this way a safety device is provided for preventing inadvertent indexing of the work during the tooling operations. Furthermore, should the operator complete the mounting of a new workpiece before the operation on the preceding piece is completed he may at once press the pre-set starting button S₃ and resume work on another machine or devote his attention to other matters. It will be observed that the pressing of the pre-set buttons S₃ initiates the next index movement of the carrier which will be rendered effective only when the tool carrier returns to its normal stop position and closes the limit switch S₅.

While the drawings illustrate only a two station machine tool, loading station and work station, it is obvious that there may be a larger number of stations merely by increasing the number of dogs A₆₋₁₆ and A₄₋₁₄ and arranging same with respect to the switches and carriers to effect the desired number of movements or stations.

So likewise may there be a plurality of tool carriers, each of which may actuate independent but serially arranged switches such as S₅ so that the work carrier is restrained from indexing until all of the heads are back, or the indexing may be controlled from or interlocked with but one of the tool carriers as above set forth. Fig. 4 illustrates diagrammatically an adaptation of the circuit for a multiple station machine and in which case the dogs or cams A₁₄ and A₁₆ are preferably placed in different planes to avoid interference.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:

1. A pre-set starting device for the transmission mechanism of a machine tool having one or more elements adapted to be moved alternately with respect to another movable element, the combination of power means for moving one of said elements, control means therefor including an electrically actuated primary control switch, a main electrical circuit for said primary switch and an auxiliary control circuit for the main circuit, each of said circuits being sub-divided into a starting circuit and a holding circuit; manually operable switch means in one of said circuits for closing a portion of the main circuit; means actuated in timed relation with the movement of one of said movable members for completing the main circuit thereby to actuate said control means and render effective the power means to another of said members; and means actuated in timed relation with the movement of said last mentioned member to render effective one of said holding circuits.

2. A pre-set starting device for the transmission mechanism of a machine tool having one or more elements adapted to be moved alternately with respect to another movable element, the combination of power means for moving one of said elements, control means for the power means to one of said elements including an electrically actuated controller, a main electrical circuit for said controller and an auxiliary control circuit for the main circuit, each of said circuits being sub-divided into a starting circuit and a holding circuit; manually operable switch means in one of said circuits adapted when actuated to close a portion of the main circuit; means actuated in timed relation with the movement of one of said movable members for closing a second portion of the main circuit whereby said control means when both portions of the main circuit are closed will be rendered effective and the power means to another of said members operative; and means actuated by the initial movement of said last mentioned member to render effective one of said holding circuits and at another portion of its movement to render both of said holding circuits ineffective.

3. In a machine tool having an element adapted to be moved and power means including an electric motor for moving said element, the combination of a control switch for rendering said motor effective; electrically actuated means for controlling the operation of said control switch, said means including a solenoid having a starting and a holding electrical circuit therefor, a switch element in said holding circuit, and a normally open switch element in said starting circuit, an electric relay device for closing the normally open switch in said starting circuit, means for controlling the operation of said relay device, said means comprising an auxiliary starting circuit with a manually operable switch therein, and an auxiliary holding circuit adapted to become effective when the manually operated switch is actuated; means operative in timed relation with the movement of said element for rendering effective the holding circuit for said solenoid; and means operable in timed relation with the movement of said element for rendering both of said holding circuits ineffective.

4. A pre-set starting device for a machine tool combining a member adapted to be moved; power means for moving said member; means for controlling the movements of said member including an electrically actuated controller mechanism for governing the action of said power means, electrical circuits for said controller comprising a controller actuating circuit having a self-opening switch therein and a controller maintaining circuit having a normally closed switch therein; an electrical relay device for closing temporarily the switch in the said controller actuating circuit; a starting circuit for the relay device having a self-opening manually operable switch therein and a holding circuit for the relay device having a normally closed switch therein; and means actuated by the movement of said movable member for cyclically controlling the operation of said switch elements.

5. In a machine tool having an element adapted to be moved and power means for moving said element, the combination of a controller mechanism for rendering said power means effective; electrically actuated means for controlling the operation of said controller, said means including a solenoid having a starting and a holding electrical circuit therefor, a switch element in said holding circuit, and a normally open switch element in said starting circuit, an electric relay device for actuating the normally open switch in controller starting circuit, means for controlling the operation of said relay device, comprising a starting circuit having a manually operable switch therein, and a holding circuit adapted to become effective when the manually operated switch is actuated; means operative in timed relation with the movement of said element to render the solenoid holding circuit alternately effective and ineffective and to render both of said holding circuits ineffective in a predetermined sequence.

6. In a machine tool having an element adapted to be moved, driving means therefor, the combination of means for controlling the action of said driving means including an electrically actuated controller, electric circuits for said controller, including a starting circuit and a holding circuit, switch means in each of said circuits, electrically operated means for moving one of said switches to its closed position, said means also including a starting circuit having a manually operable self-opening switch therein and a holding circuit therefor arranged to become effective after said self-opening switch is operated, and means operated in timed relation with the movement of said element for rendering the controller holding circuit effective and for rendering the holding circuit of said electrically operated means ineffective.

7. A pre-set starting device for a machine tool combining a member adapted to be moved; power means for moving said member; a second member adapted to be moved alternately with respect to said first member; independently operable power means for moving said second member; means for timing the movements of said members including an electrically energized controller mechanism for governing the action of one of said power means, electrical circuits for said controller comprising a controller energizing circuit having a plurality of self-opening switches serially arranged therein and a maintaining circuit having a normally closed switch therein, an electrical relay device for closing temporarily one of the switches in the controller energizing circuit, a starting circuit for the relay having a self-opening manually operable switch therein and a holding circuit for the relay having a normally closed switch therein; and means operative in timed relation with the movements of said movable members for cyclically and independently controlling the operation of said switch elements.

8. A machine tool combining an indexible element and indexing means therefor; control means for said indexing means including an electrically actuated controller mechanism adapted when shifted to an operative position to render said indexing means effective, an electric circuit for said controller mechanism including an actuating circuit and a holding circuit, switch means in each of said circuits, one of said switches adapted normally to be closed during the indexing movements of the indexible element and one of said switches being normally open during the indexing movements of said indexible element; means for closing temporarily said normally open switch thereby to effect movement of said indexible element; means actuated in timed relation with the movement of said indexible element for closing said normally open switch, and means actuated by the movement of the said indexible element to open said normally open switch.

9. In a machine tool having a work carrying member adapted to be indexed periodically and a tool carrying member adapted to be moved alternately with respect thereto and power means for moving each of said members independently, one of said power means having an electric motor therein; the combination of control means for said electric motor including an electrically actuated normally open control switch adapted when closed to render said motor operative to move said work carrying member; means including a manually controlled element and an element actuated by the movement of said tool carrying member to effect closing of said control switch and thereby render said motor operative said control switch being actuated whenever said elements have been concurrently actuated; means including an electrical circuit for maintaining said control switch closed during the movement of said work carrying member; and means actuated by the movement of said work carrying member to break said electrical circuit to render said motor inoperative.

10. In a machine tool the combination of two movable members adapted alternately to be moved relative to each other; means for imparting movement to one of said members; power means including an electric motor for imparting movement to the other of said members; control means for said motor including an electrically operated normally open control switch adapted when the actuating circuit therefor is complete to move to a closed position thereby to render said motor operative, an electric actuating circuit for said control switch, two self-opening and normally open auxiliary switches arranged in said actuating circuit, manually controlled means for closing a portion of said control switch actuating circuit and means operable in timed relation with the movement of one of said members for completing the said circuit and an auxiliary circuit rendered effective upon the completion of said last named circuit for maintaining the circuit to said control switch complete subsequent to the opening of either of said auxiliary switches.

11. A machine tool combining a translatable element and an intermittently operable translating means therefor; an indexible element and intermittently operable indexing means therefor; control means for timing the operation of said indexing means with respect to the operation of said translating means including an electrically actuated controller mechanism adapted when shifted to an operative position to render said indexing means effective, an electric circuit for said controller mechanism including an actuating circuit having a starting switch therein and a holding circuit, auxiliary switch means in each of said circuits, one of said auxiliary switches being normally closed during the indexing movement of said indexible element and one of said auxiliary switches being normally open, means actuated in timed relation with the movement of said translatable element for closing temporarily said normally open switch and manually controlled means for actuating said starting switch thereby to start the indexing movement of said indexible element and means actuated by the movement of the said indexible element to open said normally closed switch thereby to stop the indexing movement of said element at a predetermined point in its travel.

12. In a machine tool the combination of two movable members adapted alternately to be moved relative to each other; means for imparting movement to one of said members; power means for imparting movement to the other of said members; control means for said power means including an electrically operated controller mechanism adapted when the electrical circuit therefor is completed to render said power means effective to move the member associated therewith, an electric circuit for said controller, two normally open switches serially arranged in said circuit, manually controlled means for closing one of said switches and means operable in timed relation with the movement of one of said members to close said other switch thereby completing the controller circuit; and means actuated by the movement of the member propelled by said power means at a predetermined point in its travel for rendering the controller circuit ineffective thereby to stop the said power means and the movement of said last mentioned member.

13. In a machine tool having a member adapted to be indexed periodically, a member adapted to be moved alternately with respect thereto and independent driving means for moving each of said members, the combination of control means for rendering the drive means to one of said members effective including a controller mechanism and main and auxiliary control means for governing the action of said controller; means operative to render said main control means temporarily effective to govern the action of said controller; means actuated by the movement of one of said members to render said auxiliary control means effective and ineffective and to effect actuation of the driving means for the other of said members in a prearranged cycle; and means actuated by the movement of the other of said movable members to render the driving means thereto ineffective.

14. In a machine tool having a plurality of translatable tool carriers, an indexible work carrier and driving means for said carriers, and driving means to said work carrier having an electric motor therein adapted when the electrical circuit thereto is complete to propel said work carrier, the combination of electrically actuated and controlled means for timing the indexing movements of said work carrier with respect to the translatory movements of said tool carriers comprising an electrically actuated self-opening main control switch for said motor, a first auxiliary electrical circuit for said main switch having a plurality of switch elements serially arranged therein; a second auxiliary circuit for said main switch having a switch element therein manually controlled means capable of being operated prior to the completion of the translatory movements of said tool carriers for closing one of said switch elements in said first circuit; means actuated in timed relation with the respective movements of each of said tool carriers for closing the other of said switch elements in the first circuit thereby to complete the first auxiliary electrical circuit when all of said tool carriers have reached a predetermined position; and means automatically rendering said second auxiliary circuit effective and said first auxiliary circuit ineffective successively after the starting of the index movement; and means operated by the work carrier to render said second auxiliary circuit ineffective when the work carrier has been indexed to a predetermined position thereby to effect opening of said main control switch and the stopping of said motor.

15. A machine tool combining an index head; power means for indexing said head; a major supporting member on said machine tool; means for producing a cycle of relative translation between said head and said member; means for controlling said cycle; a second control means for said power means; two selectively operable devices in said control means, said power means being rendered operative initially only when both of said devices are in effective position; manual means for operating one of said devices at will to effective position; automatic means operative at a predetermined position in said relative translation to move the other of said devices to effective position; means for automatically operating said manually operative device to its ineffective position prior to the completion of an index movement; and means for maintaining said power means operative to complete an index movement after said manually operative device has been moved to its ineffective position.

16. A machine tool combining an index member; power means for indexing said member; a second member, one of said members being adapted to support a tool and the other a work piece; means for producing a cycle of relative translation of approach and retraction between said members; control means for said translating means including means for initiating said cycle and for bringing the translatable member to a retracted position of rest at the completion of a cycle; a second control means for said power means; two selectively operable devices in said control means, said power indexing means being operative to initiate an index movement only when both said devices are in effective position; manual means for operating one of said devices at will to effective position; means automatically operative at the position of rest of said translatable member to move the other of said devices to effective position, said other device having means for normally returning it to ineffective position when said translatable member is moved from its position of rest; means for automatically operating said manually operative device to its ineffective position prior the completion of an index movement; and means for maintaining said power means operative after said manually operative device has been moved to its ineffective position to complete an index movement.

17. In a machine tool having two relatively movable members, said members being movable alternately with respect to each other and power means adapted, when rendered effective, to propel each of said members through a predetermined operating cycle, the combination of means operatively connected with each of said members normally adapted to render the power means to the other member effective automatically upon the completion of the normal cycle of movement of the first mentioned member; means including a manually operable device for delaying the action of one of said automatic means unless or until said device has been actuated from an effective to an ineffective delaying position, movement of one of said members thereby occurring only after the movement of the other has been completed and the said manually operable device has been actuated; and means operated by the movement of the aforesaid one of said members and prior to the completion of its normal movement automatically restoring said device to its effective delaying position.

EARL EDGAR OPEL.